US009693025B2

(12) United States Patent
Tsuji

(10) Patent No.: US 9,693,025 B2
(45) Date of Patent: Jun. 27, 2017

(54) IMAGE PROJECTOR, IMAGE PROJECTION METHOD, AND RECORDING MEDIUM

(71) Applicant: Shigekazu Tsuji, Tokyo (JP)

(72) Inventor: Shigekazu Tsuji, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/950,251

(22) Filed: Nov. 24, 2015

(65) Prior Publication Data

US 2016/0165195 A1 Jun. 9, 2016

(30) Foreign Application Priority Data

Dec. 4, 2014 (JP) ................... 2014-246108
Nov. 4, 2015 (JP) ................... 2015-216961

(51) Int. Cl.
| | |
|---|---|
| G02B 26/00 | (2006.01) |
| H04N 9/31 | (2006.01) |
| G03B 21/20 | (2006.01) |
| G03B 21/16 | (2006.01) |
| G03B 33/08 | (2006.01) |

(52) U.S. Cl.
CPC ......... *H04N 9/3111* (2013.01); *G02B 26/008* (2013.01); *G03B 21/16* (2013.01); *G03B 21/2053* (2013.01); *H04N 9/3155* (2013.01); *G03B 21/2026* (2013.01); *G03B 33/08* (2013.01)

(58) Field of Classification Search
CPC .. H04N 9/3114; H04N 9/3111; G03B 21/202; G03B 21/2026; G03B 21/20; G03B 21/005; G03B 21/008; G02B 26/007; G02B 26/008
USPC ............................................ 353/84; 359/889
See application file for complete search history.

(56) References Cited

U.S. PATENT DOCUMENTS

| | | | |
|---|---|---|---|
| 5,650,832 | A | 7/1997 | Poradish et al. |
| 6,874,892 | B1 | 4/2005 | McDaniel |
| 2006/0082734 | A1 | 4/2006 | Beasley et al. |
| 2013/0031283 | A1 | 1/2013 | Tsuji |
| 2013/0107227 | A1 | 5/2013 | Tsuji et al. |

(Continued)

FOREIGN PATENT DOCUMENTS

| | | |
|---|---|---|
| CN | 102636947 A | 8/2012 |
| JP | 2006-215431 | 8/2006 |
| JP | 2014-077980 | 5/2014 |

OTHER PUBLICATIONS

Extended European Search Report issued on Apr. 8, 2016 in Patent Application No. 15197191.8.

(Continued)

*Primary Examiner* — William C Dowling
*Assistant Examiner* — Ryan Howard
(74) *Attorney, Agent, or Firm* — Oblon, McClelland, Maier & Neustadt, L.L.P.

(57) ABSTRACT

An image projector includes a light source to emit light, an image forming device to form an image based on a reflected light of the light emitted from the light source, a color wheel disposed between the light source and the image forming device so as to pass the light emitted from the light source to the image forming device through an optical path, the color wheel including a plurality of color filters, at least one lens to project the image formed on the image forming device to a projection surface as a projection image, and circuitry to cause the color wheel be moved away from the optical path for the light emitted from the light source, when a brightness of the projection image is to be increased.

14 Claims, 5 Drawing Sheets

(56) References Cited

U.S. PATENT DOCUMENTS

| | | |
|---|---|---|
| 2013/0107228 A1 | 5/2013 | Tsuji et al. |
| 2013/0335451 A1 | 12/2013 | Tsuji |
| 2014/0376531 A1 | 12/2014 | Tsuji |
| 2015/0253653 A1 | 9/2015 | Fujita et al. |
| 2015/0334361 A1 | 11/2015 | Tsuji |

OTHER PUBLICATIONS

Office Action issued Mar. 1, 2017 in Chinese Patent Application No. 201510801032.6.

IMAGE PROJECTOR, IMAGE PROJECTION METHOD, AND RECORDING MEDIUM

CROSS-REFERENCE TO RELATED APPLICATIONS

This patent application is based on and claims priority pursuant to 35 U.S.C. §119(a) to Japanese Patent Application Nos. 2014-246108, filed on Dec. 4, 2014, and 2015-216961, filed on Nov. 4, 2015, in the Japan Patent Office, the entire disclosure of which is hereby incorporated by reference herein.

BACKGROUND

Technical Field

The present invention generally relates to an image projector, an image projection method, and an image projection control program stored in a non-transitory recording medium.

Description of the Related Art

The image projectors are widely used in various scenes such as at meeting, presentation, or training. For example, the image projectors may project an image on a display such as a liquid crystal display or plasma display, a projection surface such as a screen, or even on a wall, during meeting. In another example, the image projectors may be used as a part of home theater system.

When the image projectors are used for a home theater, the image projectors usually project an image of various colors, such that high color reproducibility is desired. On the other hand, when the image projectors are used for meeting or presentation, the image projectors usually project a document image, such that high brightness is desired.

Japanese Patent Application Publication No. 2006-215431 discloses a digital light processing (DLP) projector having two types of color wheel, one color wheel suitable for improving brightness, and the other color wheel suitable for improving color tone. The projector of this application has a dial switch, which switches between the color wheel for brightness and the color wheel for color tone, to output a projection image suitable for an application of the projection image.

SUMMARY

Example embodiments of the present invention include an image projector that includes a light source to emit light, an image forming device to form an image based on a reflected light of the light emitted from the light source, a color wheel disposed between the light source and the image forming device so as to pass the light emitted from the light source to the image forming device through an optical path, the color wheel including a plurality of color filters, at least one lens to project the image formed on the image forming device to a projection surface as a projection image, and circuitry to cause the color wheel be moved away from the optical path for the light emitted from the light source, when a brightness of the projection image is to be increased.

In one example, the circuitry causes the light source to stop emitting the light, and causes the color wheel to stop rotating, before causing the color wheel be moved away from the optical path. The circuitry further causes the light source to start emitting the light after the color wheel is moved away from the optical path so as to emit the light from the light source to the image forming device without intervening the color wheel.

In another example, the circuitry causes the light source to emit the light having an output level less than a predetermined output level, and causes the color wheel to stop rotating, before causing the color wheel be moved away from the optical path. The circuitry further causes the light source to emit the light having the predetermined output level.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
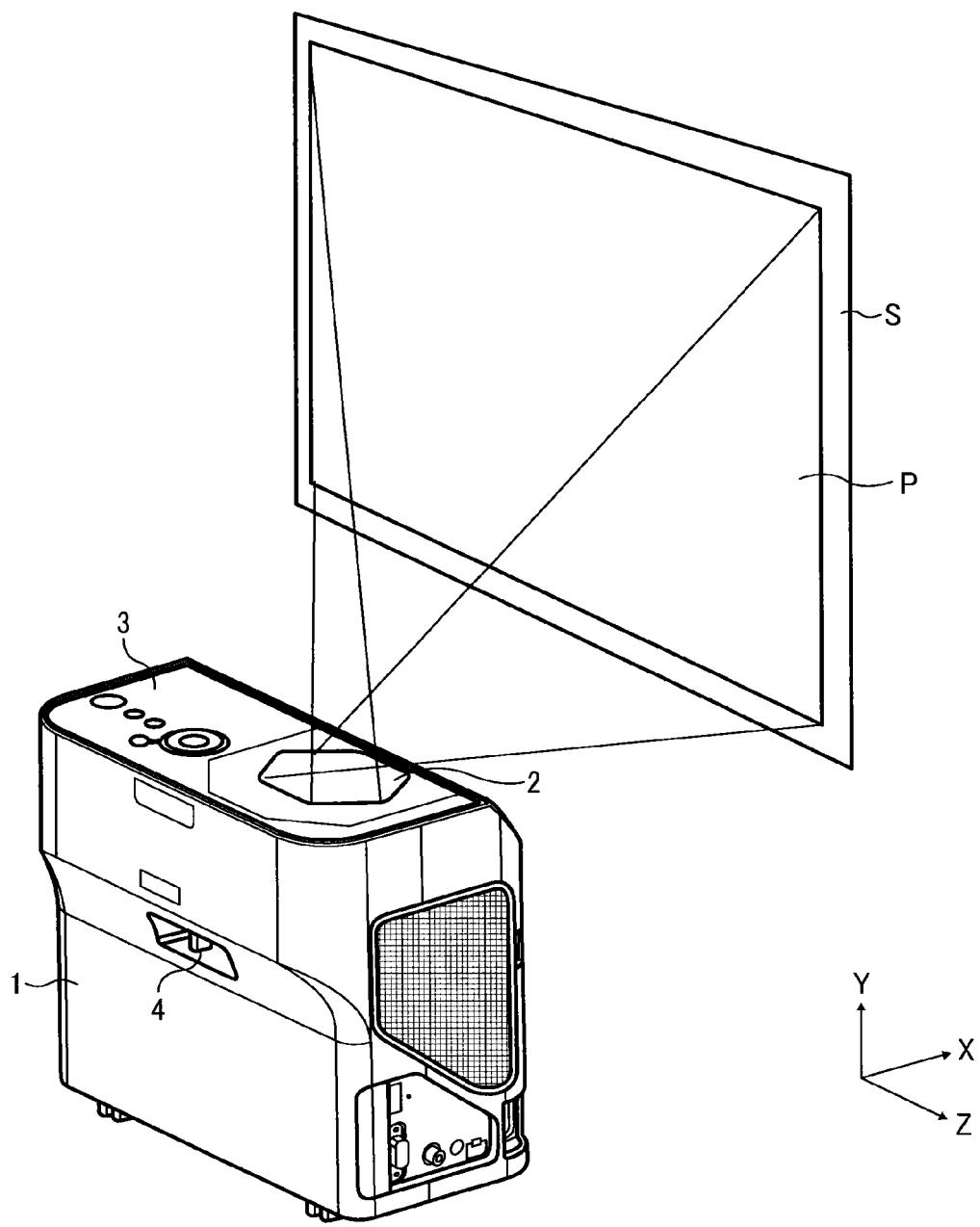
FIG. 1 is a perspective view illustrating an image projector according to an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

FIG. 1 is a perspective view illustrating an image projector 1 and a projection surface S such as a screen. In the following, X-direction corresponds to the normal direction of projection surface S, Y-direction corresponds to a short-side length of the projection surface S that is a vertical direction, and Z-direction corresponds to a long-side length of the projection surface S that is a horizontal direction.

As illustrated in FIG. 1, the projector 1 has a transparent glass 2 on the upper surface of the image projector 1, through which a projection image P is emitted from the inside of the projector 1. The projection image P, which is emitted through the transparent glass 2, is projected onto the projection surface S such as the screen.

The image projector 1 further includes an operation panel 3 having various keys, which together function as an operation unit 16 for allowing a user to operate the image projector 1. The image projector 1 further includes a focus lever 4 that allows the user to adjust focusing of the image projector 1. The user operates various keys on the operation panel 3 to input user's instruction to adjust, for example, color or contrast of the projection image P, or configure network settings such as an IP address.

Figure 2:
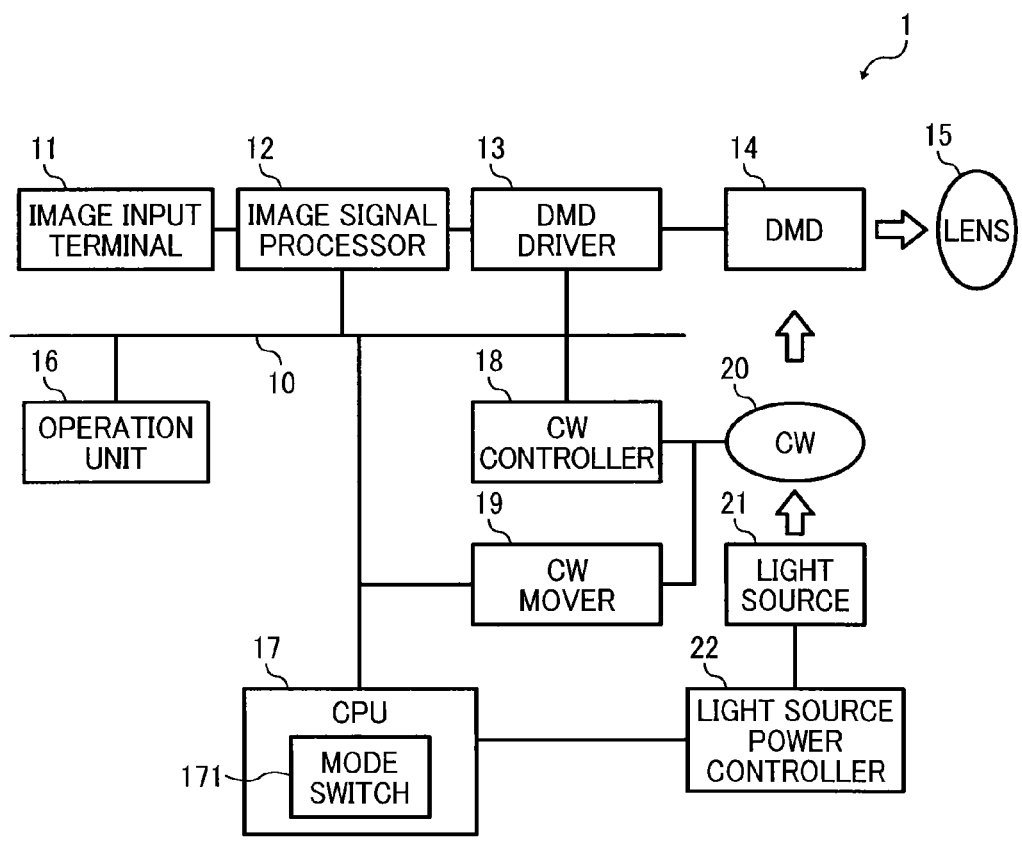
FIG. 2 is a schematic block diagram illustrating a structure of the image projector of FIG. 1.

Referring to FIG. 2, a configuration of the image projector 1 is described according to an embodiment of the present invention. The image projector 1 includes an image input terminal 11, an image signal processor 12, a digital micromirror device (DMD) driver 13, a DMD 14, a lens 15, the operation unit 16, a central processing unit (CPU) 17, a color wheel (CW) controller 18, a CW mover 19, a CW 20, a light source 21, and a light source power controller 22.

The image input terminal 11 may be implemented by any terminal such as a RGB or HDMI terminal, which is input with image data from the outside device such as a personal computer (PC). One or more image input terminals 11 may be provided.

The image signal processor 22, which may be implemented by an image signal processing circuit, performs various image processing on the image data input by the image input terminal 11. Examples of image processing include, but not limited to, contrast adjustment, brightness adjustment, sharpness adjustment, scaling, and superimposing menu data. Based on the image data processed by the image signal processor 12, the CPU 17 controls the light source 21, through the light source power controller 22, to emit light to form an image, which is to be projected onto the projection surface S through the lens 15.

The DMD 14 is an image forming element, which forms an image thereon according to light emitted from the light source 21 via or not via the CW 20. The DMD 14 has a plurality of mirrors arranged in an array so as to correspond to pixels in the image to be projected.

The DMD driver 13 drives the DMD 14 such that the DMD 14 modulates the light beams of respective colors, which are separated by the CW 20 in time division. More specifically, the DMD driver 13 toggles on or off the mirrors of the DMD 14 based on the image data processed by the image signal processor 12 to form the image thereon.

The operation unit 16 includes various keys such as a power-on key, and various operation keys for executing various functions of the image projector 1, according to the user instruction. The operation unit 16 may be provided with a light crystal display with a touch panel function. In such case, the touch panel can receive the user input in addition to displaying information.

The CPU 17 controls various units or devices of the image projector 1 through the bus 10, such as the image signal processor 12, DMD driver 13, light source power controller 22, CW controller 18, CW mover 19, and operation unit 16. More specifically, the CPU 17 includes a processor, which operates according to a control program stored on a memory. As described below, the CPU 17 is provided with a mode switch 171, which changes an operating mode of the image projector 1 to a brightness adjustment mode in which brightness of a projection image can be adjusted.

The CW 20, a disc that can rapidly spin, is displaced between the DMD 14 and the light source 21. The CW 20 is divided into sectors that are arranged along the circumferential direction, each containing a filter of a specific color as described below referring to FIG. 5.

The CW controller 18 controls rotation of the CW 20, so as to produce colors of the image according to the processed image data. More specifically, the CW controller 18 controls a signal for driving a motor to rotate the CW 20.

The CW mover 19 moves the CW 20 away from the optical path of the light emitted from the light source 21 under control of the CPU 17 as described below.

The light source 21 emits the light, when supplied with power from the light source power controller 22. The light source power controller 22 controls power to be supplied to the light source 21. Further, the light source power controller 22 controls light intensity of the light from the light source 21 under control of the CPU 17.

As described above, the CPU 17 is provided with a function as the mode switch 171, which is executed according to the user instruction received at the operation unit 16. In this example, the mode switch 171 switches between the brightness adjustment mode (first mode) in which brightness of the projection image is adjusted, and a normal operating mode (second mode) in which no brightness adjustment is applied. The brightness adjustment mode is preferably a mode in which the brightness of the projection image is kept at maximum.

Figure 5:
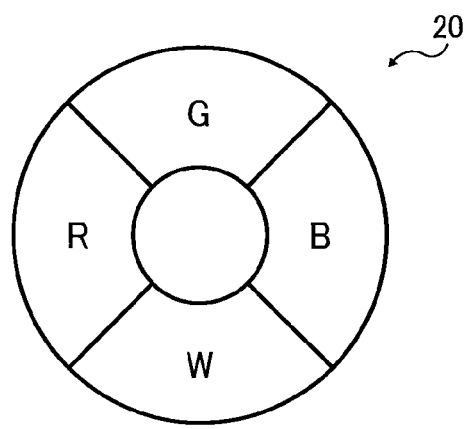
FIG. 5 is a schematic diagram illustrating the color wheel of the image projector of FIG. 1.

Referring to FIG. 5, color filters of the CW 20 is explained according to this embodiment. The CW 20 includes the red filter (R), green filter (G), blue filter (B), and white or transparent filter (W), which are arranged in circumferential direction. In addition to chromatic colors of R, G, and B, the CW 20 in this example has the transparent color filter (W) to increase brightness. In order to increase the brightness of the projection image, an area of the transparent filter may be made larger. This, however, degrades color tone as the chromatic filter areas decrease.

In operation, to produce the color image, the CW controller 18 outputs the drive signal for driving the motor to rotate the CW 20. As the light emitted from the light source 21 passes through the CW 20 that is rotating, the DMD 14, which receives the emitted light, is controlled to have its mirrors toggled on or off according to the processed image data through the DMD driver 13. This causes the colors be cycled at a fast enough rate that the human eye sees a full-color image.

The color filters of the CW 20, specifically, the respective areas of the chromatic color filters, may be changed to adjust the color tone of the projection image, thus improving quality of the projection image containing colors. On the other hand, in case the projection image mainly contains characters, the brightness of the projection image is more important than the color tone, such that it is preferable to have a sufficient area of the transparent filter area (W).

In view of the above, when brightness is to be increased, the CW 20 may be moved away at least from the optical path of the emitted light, such that the light emitted from the light source 21 focuses on the DMD 14 without via the CW 20. This greatly increases the brightness of the projection image, with a greater light use efficiency. Even without the CW 20, the mirrors of the DMD 14 are turned on or off under control of the DMD driver 13 to control grayscale color tone, even when the projection image contains color character such as a red-color character. With this configuration, the image projector 1 is able to improve brightness of the projection image, for example, when the projection image contains characters.

Figure 3:
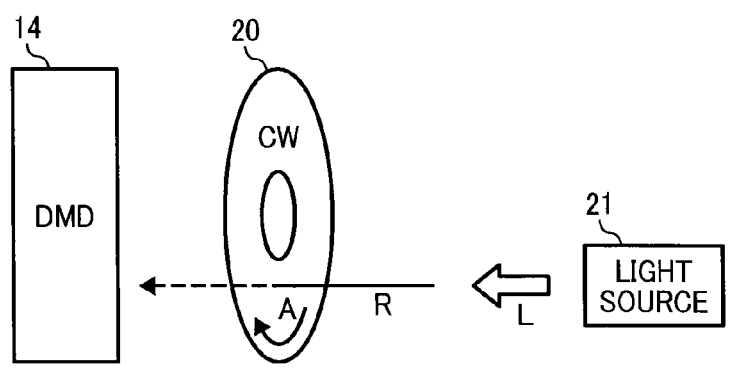
FIG. 3 is a schematic diagram illustrating an optical path of light emitted from a light source through a color wheel of the image projector of FIG. 1.

Referring now to FIG. 3, example operation of emitting the light from the light source through the CW 20 to form an image on the DMD 14 is explained. The light L emitted from the light source 21 passes, along the optical path R, through the color filter of the CW 20, to form an optical image on the DMD 14. In this example, the CW 20 rotates in the direction A under control of the CW controller 18. With this rotation, the CW 20 is prevented from being heated by the emitted light at a specific location. That is, if the CW 20 stops rotating while receiving the light from the light source 21, the location that continuously receives the light may be damaged due to the heat.

Figure 4:
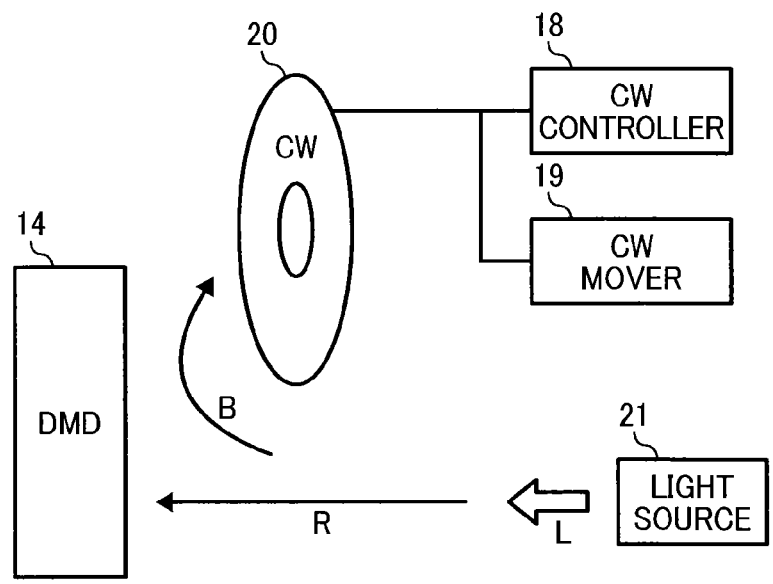
FIG. 4 is a schematic diagram illustrating an optical path of light emitted from the light source of the image projector of FIG. 1 when the color wheel is removed away from the optical path.

Referring now to FIG. 4, example operation of moving the CW 20 away from the optical path R of the emitted light from the light source 21 is explained. For example, when the power switch 171 of the CPU 17 detects the user input for changing to the brightness adjustment mode, the CPU 17 instructs the CW mover 19 to move the CW 20 away from the optical path R. Such input may include a user input that instructs to increase the brightness of the projection image at maximum. For example, the operation unit 16 may include a specific key, which allows the user to select the brightness adjustment mode, such as a monochrome mode in which the brightness of the projection image is increased at maximum. In such case, the CPU 17 instructs the light source power controller 22 to stop supplying electric power to the light source 21, and further instructs the CW controller 18 to stop rotating the CW 20. The CPU 17 further instructs the CW mover 19 to move the CW 20 away from the optical path R of the emitted light L from the light source 21, for example, in the direction B in FIG. 4.

In this embodiment, the CW mover 19 may be implemented by a set of instructions of the CPU 17. For example, the CW 20 may be attached to a hub, or any part of hardware of the projector 1. According to the instructions of the CPU 17, the CW mover 19 moves the part to which the CW 20 is attached, so as to move the CW 20 away from the optical path R. Similarly, according to the instructions of the CPU 17, the CW mover 19 moves the part to which the CW 20 is attached, so as to move the CW 20 back to an initial (default) position.

After moving the CW 20 away from the optical path R in the direction B in FIG. 4, the CPU 17 instructs the light source power controller 22 to start supplying electric power to the light source 21.

Figure 6:
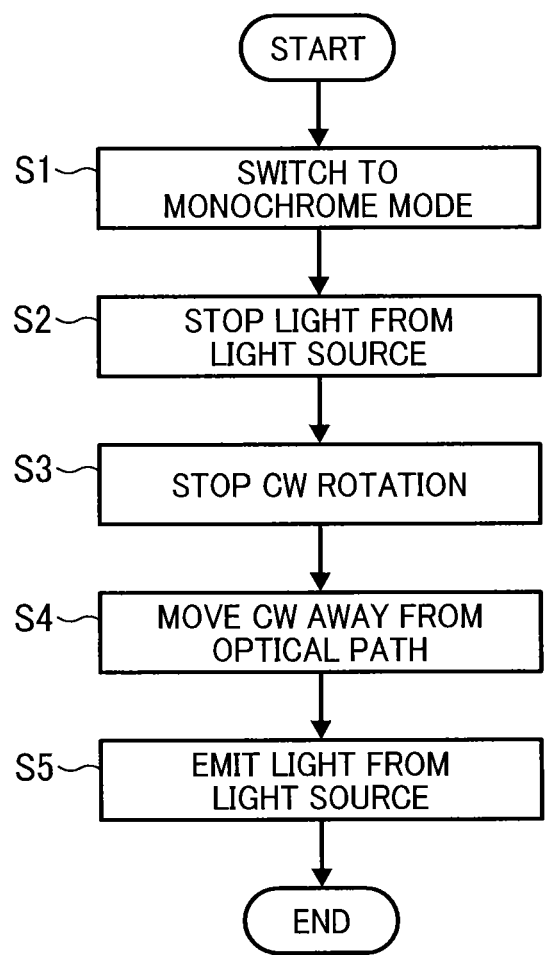
FIG. 6 is a flowchart illustrating operation of adjusting brightness of the projection image, performed by the image projector of FIG. 1, according to an embodiment of the present invention.

Referring to FIG. 6, operation of controlling brightness of the projection image is explained according to an embodiment of the present invention. The operation of FIG. 6 is performed by the CPU 17 according to the control program stored in the memory.

At S1, the power switch 171 of the CPU 17 switches from the normal operating mode (second mode) to the monochrome mode (first mode), for example, according to the user input through the operation unit 16.

At S2, under control of the CPU 17, the light source power controller 22 stops supplying electric power to the light source 21, such that the light source 21 stops emitting the light.

At S3, under control of the CPU 17, the CW controller 18 stops rotating the CW 20.

At S4, under control of the CPU 17, the CW mover 19 moves the CW 20 away from the optical path R of the emitted light from the light source 21.

At S5, under control of the CPU 17, the light source power controller 22 starts supplying electric power to the light source 21, such that the light source 21 starts emitting the light directly to the DMD 14.

As described above, in case of projecting an image such as an image only or mainly containing characters, the user simply needs to change to the monochrome mode to output the projection image with high brightness. In such case, after the light source 21 stops emitting the light, and the CW 20 stops rotating, the CW 20 is moved away from the optical path R. This prevents the CW 20 from being heated by the emitted light, thus preventing a damage to the CW 20.

Figure 7:
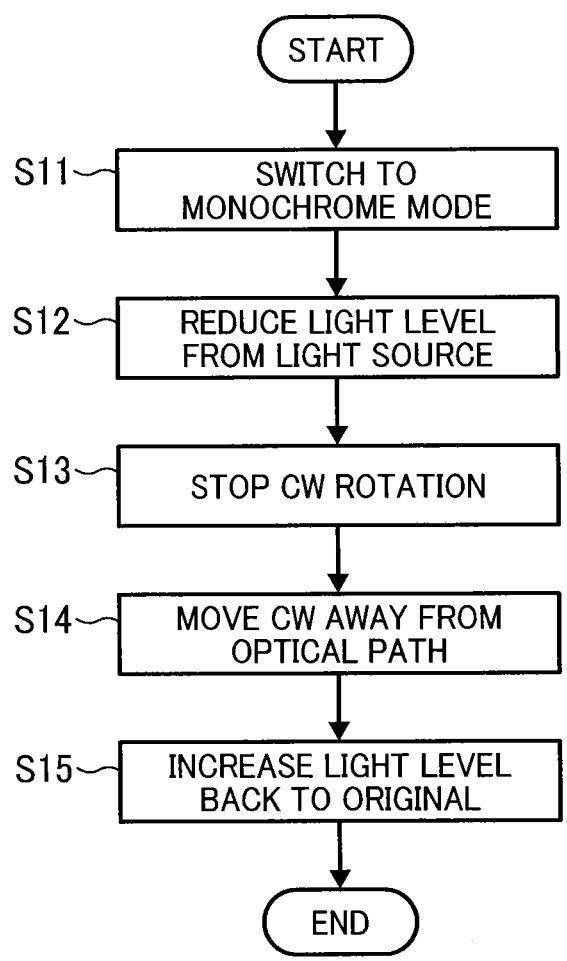
FIG. 7 is a flowchart illustrating operation of adjusting brightness of the projection image, performed by the image projector of FIG. 1, according to an embodiment of the present invention.

Referring now to FIG. 7, operation of controlling brightness of the projection image is explained according to an embodiment of the present invention. The operation of FIG. 7 is substantially similar to the operation of FIG. 6, except that light level of the light from the light source 21 is reduced in alternative to stopping the light source 21 to emit the light.

At S11, the power switch 171 of the CPU 17 switches from the normal operating mode (second mode) to the monochrome mode (first mode) as described above referring to S1 of FIG. 6

At S12, under control of the CPU 17, the light source power controller 22 reduces electric power to be supplied to the light source 21 under a predetermined level, such that the light source 21 reduces the light level of the light to be emitted. Alternatively, the CPU 17 may cause the light source 21 to reduce the light level of the emitted light, while keeping the level of the electric power supplied to the light source 21.

S13 and S14 are performed in a substantially similar manner as described above referring to S3 and S4 of FIG. 6.

After moving the CW 20 away from the optical path R of the emitted light at S14, at S15, under control of the CPU 17, the light source power controller 22 increases the electric power to be supplied to the light source 21, back to the normal level, such that the light source 21 increases the light level of the light to be emitted back to the normal level.

If the electric power supply to the light source 21, such as a mercury lamp, is stopped, the light source 21 requires time to increase the output light level back to the normal level. As described above, through decreasing the light level of the light source 21 to a level as defined by the predetermined power level, a damage to the CW 20 that stops rotating can be suppressed while reducing time for the light source 21 to increase the light level to the normal level.

The predetermined level of electric power to be supplied may be previously determined to a level that causes the light source 21 to output the emitted light having a light level that does not damage the CW 20, such as to a minimum level.

As described above, in some embodiments of the present invention, as the color wheel is moved away from the optical path, the color wheel is prevented from being heated by the emitted light, thus preventing a damage to the color wheel. In addition, the above-described configuration does not require a plurality of color wheels, or changing from one color wheel to the other, to increase the brightness of the projection image, thus simplifying the configuration of the image projector.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

For example, in alternative to receiving various instructions through the operation unit 16, the image projector 1 may be additionally provided with a remote controller that operates as the operation unit 16.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC) and conventional circuit components arranged to perform the recited functions.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

The invention claimed is:

1. An image projector, comprising:
a light source to emit light;
an image forming device to form an image based on a reflected light of the light emitted from the light source;
a color wheel disposed between the light source and the image forming device so as to pass the light emitted from the light source to the image forming device through an optical path, the color wheel including a plurality of color filters;
at least one lens to project the image formed on the image forming device to a projection surface as a projection image; and
circuitry to:
cause the color wheel be moved away from the optical path for the light emitted from the light source, when a brightness of the projection image is to be increased,
cause the light source to stop emitting the light, and cause the color wheel to stop rotating, before causing the color wheel be moved away from the optical path, and
cause the light source to start emitting the light after the color wheel is moved away from the optical path so as to emit the light from the light source to the image forming device without intervening the color wheel.

2. The image projector of claim 1, wherein the circuitry moves the color wheel away from the optical path, in response to an instruction for switching from a second mode to a first mode.

3. The image projector of claim 2, wherein the first mode is a mode in which a brightness of the projection image is increased to a level greater than a brightness of the projection image to be projected when the image projector operates in the second mode.

4. The image projector of claim 3, wherein the first mode is a mode in which a brightness of the projection image is increased to a maximum level.

5. The image projector of claim 4, wherein the first mode is a mode suitable for projecting the projection image that contains mainly characters.

6. The image projector of claim 2, further comprising:
an operation unit configured to receive the instruction for switching from the second mode to the first mode.

7. The image projector of claim 1, further comprising:
a light source power controller to supply electric power to the light source,
wherein the circuitry controls an output level of the light emitted from the light source, through controlling an amount of electric power to be supplied from the light source power controller to the light source.

8. An image projector, comprising:
a light source to emit light;
an image forming device to form an image based on a reflected light of the light emitted from the light source;
a color wheel disposed between the light source and the image forming device so as to pass the light emitted from the light source to the image forming device through an optical path, the color wheel including a plurality of color filters;
at least one lens to project the image formed on the image forming device to a projection surface as a projection image; and circuitry to:
cause the color wheel be moved away from the optical path for the light emitted from the light source, when a brightness of the projection image is to be increased,
cause the light source to emit the light having an output level less than a predetermined output level, and cause the color wheel to stop rotating, before causing the color wheel be moved away from the optical path, and
cause the light source to emit the light having the predetermined output level after the color wheel is moved away from the optical path so as to emit the light from the light source to the image forming device without intervening the color wheel.

9. A method of projecting an image, comprising:
emitting light with a light source;
receiving an instruction for switching from a second mode to a first mode;
causing the light source to stop emitting the light;
causing a color wheel, disposed between the light source and an image forming device, to stop rotating;
causing the color wheel be moved away from an optical path for the light emitted from the light source;
causing the light source to start emitting the light to the image forming device without intervening the color wheel to form an image on the image forming device based on a reflected light of the light emitted from the light source; and
projecting the image formed on the image forming device to a projection surface as a projection image.

10. The method of claim 9, wherein the first mode is a mode in which a brightness of the projection image is increased to a level greater than a brightness of the projection image to be projected when the image projector operates in the second mode.

11. The image projector of claim 10, wherein the first mode is a mode in which a brightness of the projection image is increased to a maximum level.

12. A method of projecting an image, comprising:
emitting light with a light source;
receiving an instruction for switching from a second mode to a first mode;
causing the light source to reduce an output level of the light from a predetermined output level;
causing a color wheel, disposed between the light source and an image forming device, to stop rotating;
causing the color wheel be moved away from an optical path for the light emitted from the light source;
causing the light source to start emitting the light having the predetermined output level to the image forming device without intervening the color wheel to form an image on the image forming device based on a reflected light of the light emitted from the light source; and
projecting the image formed on the image forming device to a projection surface as a projection image.

13. The method of claim 12, wherein the first mode is a mode in which a brightness of the projection image is increased to a level greater than a brightness of the projection image to be projected when the image projector operates in the first mode.

14. The method of claim 13, wherein the first mode is a mode in which a brightness of the projection image is increased to a maximum level.

* * * * *